US008700736B2

(12) United States Patent
Lee et al.

(10) Patent No.: US 8,700,736 B2
(45) Date of Patent: Apr. 15, 2014

(54) SYSTEM FOR PROVIDING RELATED CONTENT, METHOD FOR PROVIDING RELATED CONTENT, SERVICE SERVER, END TERMINAL, AND STORAGE MEDIUM

(75) Inventors: Jeong Hoon Lee, Seoul (KR); Jeong Min You, Seoul (KR); In Hwan Kim, Seoul (KR)

(73) Assignee: SK Planet Co., Ltd. (KR)

( * ) Notice: Subject to any disclaimer, the term of this patent is extended or adjusted under 35 U.S.C. 154(b) by 349 days.

(21) Appl. No.: 13/128,679

(22) PCT Filed: Oct. 16, 2009

(86) PCT No.: PCT/KR2009/005957

§ 371 (c)(1), (2), (4) Date: May 11, 2011

(87) PCT Pub. No.: WO2010/055998

PCT Pub. Date: May 20, 2010

(65) Prior Publication Data

US 2011/0219095 A1 Sep. 8, 2011

(30) Foreign Application Priority Data

Nov. 13, 2008 (KR) ........................ 10-2008-0112795

(51) Int. Cl.
*H04L 29/06* (2006.01)

(52) U.S. Cl.
USPC ........... 709/218; 709/219; 709/230; 709/231; 709/232; 709/238

(58) Field of Classification Search
None
See application file for complete search history.

(56) References Cited

U.S. PATENT DOCUMENTS

2002/0022453 A1* 2/2002 Balog et al. ..................... 455/41
2006/0270395 A1 11/2006 Dhawan et al.
2008/0320543 A1* 12/2008 Wang et al. ................... 725/131
2010/0095332 A1* 4/2010 Gran et al. ...................... 725/93

FOREIGN PATENT DOCUMENTS

JP 2004-171291 6/2004
JP 2007-282255 10/2007
KR 1020060023857 3/2006
KR 1020080063513 7/2008

* cited by examiner

*Primary Examiner* — Kenny Lin
*Assistant Examiner* — Abdelnabi Musa
(74) *Attorney, Agent, or Firm* — Baker Hostetler LLP

(57) ABSTRACT

A system and method for providing a related content and a service server, an end terminal, and a storage medium wherein the system comprises a first end terminal connected to a mobile communication terminal through a local area network for making a request to an application server to send the content related to the basic content currently being played in the first end terminal to a second terminal; a mobile communication terminal connected to the first end terminal and to the second end terminal via the local are network, and connected to the service server via the local area network, and connected to the service server via a mobile communication network for transmitting data between the end terminals and the service server and the application server and wherein the service server receives the related content transmission request from the first end terminal and makes a request to the application server to search for the related content for transmission by the application server to the second end terminal in accordance with the request from the service server.

9 Claims, 7 Drawing Sheets

SYSTEM FOR PROVIDING RELATED CONTENT, METHOD FOR PROVIDING RELATED CONTENT, SERVICE SERVER, END TERMINAL, AND STORAGE MEDIUM

BACKGROUND OF THE INVENTION

1. Field of the Invention

The present invention relates to a system for providing a related content, a method for providing a related content, a service server, an end terminal, and a storage medium. More specifically, the invention relates to a technique of enabling a second end terminal to play a content related to a basic content which is requested to a service server by a first end terminal.

2. Background of the Related Art

With the development of information communication technology, a variety of end terminals capable of playing texts, images and videos (referred to as 'contents' hereinafter as long as there is no specific explanation), such as MP3 (MPEG audio layer-3) player, PMP (Personal Multimedia Player), and UMPC (Ultra Mobile Personal Computer), are used. These end terminals download a content requested by a user from a personal computer and play the content. However, the end terminals cannot download the content when the user is moving or when the end terminals cannot be connected to the personal computer.

To solve this problem, there was proposed a technique of adding communication means connectable to a LAN (Local Area Network) such as Bluetooth, UWB (Ultra Wide Band) or the like to an end terminal and connecting the end terminal to a mobile communication terminal through a LAN.

Meantime, the user may want to check contents related to a basic content currently being played in the end terminal (for example, the related contents correspond to music video, album information, singer information, singer picture, singer related news, concert information, and Karaoke files if the basic content is a music file). If the end terminal has restricted hardware specifications (processing speed, screen size, etc.), the user wants to play the related contents through an end terminal having higher hardware specifications. To achieve this, the user searches for and plays the related contents using a computer. However, the user cannot execute a desired operation if the user has no computer or cannot access the Internet at the time when the user wants to search for and play the related contents.

SUMMARY OF THE INVENTION

Accordingly, the present invention has been made in view of the above-mentioned problems occurring in the prior art, and it is a primary object of the present invention to provide a technique of enabling an end terminal a user wants to play a content related to a basic content.

To accomplish the above object of the present invention, according to an aspect of the present invention, there is provided a system for providing a related content, which comprises a first end terminal connected to a mobile communication terminal through a LAN and requesting an application server to transmit a content related to a basic content currently played in the first end terminal or selected by a user to a second end terminal; the mobile communication terminal connected to the first end terminal and the second end terminal through the LAN and connected to a service server through a mobile communication network, and configured to transmit data between the first and second end terminals and the service server and between the first and second end terminals and the application server; the service server connected to the mobile communication terminal through the mobile communication network and connected to the application server through a wired communication network, and configured to receive the related content transmission request from the first end terminal and request the application server to search for the related content and transmit the related content to the second end terminal; and the application server connected to the service server through the wired communication network and configured to transmit the related content to the second end terminal at the request of the service server.

The first end terminal may display a related content selecting menu in the form of a pop-up window on a screen and display an end terminal list received from the service server in the form of a pop-up window on the screen.

The system may further comprise a charging server connected to the service server through the mobile communication network or the wired communication network and configured to charge the mobile communication terminal when the related content is transmitted from the application server to the second end terminal.

To accomplish the above object of the present invention, according to another aspect of the present invention, there is provided a method for providing a related content in a system constructed in such a manner that a first end terminal and a second end terminal are connected to a mobile communication terminal through a LAN, the mobile communication terminal is connected to a service server through a mobile communication network, the service serve is connected to an application server through a wired communication network, the method comprising connecting the first end terminal to the service server via the mobile communication terminal; requesting the service server by the first end terminal to provide a content related to a basic content currently being played in the first end terminal or selected by a user; transmitting basic content information from the first end terminal to the service server; requesting the application server by the service server to search for the related content based on the basic content information; transmitting a list of searched related contents and a list of end terminals capable of receiving the related contents from the service server to the mobile communication terminal; displaying the related content list and the end terminal list through the mobile communication terminal or the first end terminal; selecting the related content, which will be received by the mobile communication terminal or the first end terminal, and the second end terminal as the end terminal which will receive the related content; and transmitting the selected related content from the application server to the second end terminal at the request of the service server.

The method may further comprise before the transmitting of the related content from the application server to the second end terminal checking whether the related content requires conversion; checking whether the related content can be converted when the related content requires conversion; and converting the related content based on the hardware specifications of the second end terminal when the related content can be converted.

The related content may be converted by the application server.

The method may further comprise playing the related content through the second end terminal.

To accomplish the above object of the present invention, according to another aspect of the present invention, there is provided a service server providing a related content, which comprises a communication unit configured to transmit/receive data through a mobile communication network; a mobile communication terminal manager configured to manage information about a mobile communication terminal, received through the communication unit; an end terminal manager configured to manage information about first and second end terminals, received through the communication unit; a LAN manager configured to manage information about a LAN that relays communications between the mobile communication terminal and the end terminals; a storage unit configured to store the information about the mobile communication terminal, the end terminals and the LAN; and a controller configured to control the operations of the components, the controller searching for a content related to a basic content currently being played in the first end terminal or selected by a user through an applications server and requesting the application server to transmit the related content to the second end terminal when receiving a request for transmitting the related content to the second end terminal from the first end terminal.

The controller may check whether the related content requires conversion based on hardware specification information of the second end terminal, managed by the end terminal manager, and additionally perform an operation of requesting the application server to convert the related content through the communication unit if the related content requires conversion.

The controller may check whether the related content requires conversion based on the hardware specification information of the second end terminal, managed by the end terminal manager, and additionally perform an operation of receiving the related content from the application server and converting the related content if the related content requires conversion.

The controller may transmit a list of end terminals capable of receiving contents to the first end terminal with reference to history information of the first end terminal when requested by the first end terminal to provide the list of end terminals capable of receiving contents and set an end terminal selected by the first end terminal to the second end terminal.

To accomplish the above object of the present invention, according to another aspect of the present invention, there is provided a method of providing a related content by a service server, which comprises allowing a first end terminal to be connected to the service server via a mobile communication terminal; receiving a request for a related content from the first end terminal; receiving information about a basic content currently being played in the first end terminal or selected by a user from the first end terminal; requesting the application server to search for the related content based on the information about the basic content; transmitting a list of the searched related contents and a list of end terminals capable of receiving the related contents to the mobile communication terminal; receiving information about selection of a related content, which will be received by the mobile communication terminal or the first end terminal, and the second terminal as the end terminal which will receive the related content from the mobile communication terminal or the first end terminal; and requesting the application server to transmit the selected related content to the second end terminal.

The method may further comprise before the requesting of the application server to transmit the selected related content to the second end terminal checking whether the related content requires conversion; checking whether the related content can be converted when the related content requires conversion; and requesting the application server to convert the related content based on the hardware specifications of the second end terminal when the related content can be converted and transmitting the related content to the second end terminal.

The related content may be converted by the service server.

To accomplish the above object of the present invention, according to another aspect of the present invention, there is provided a storage medium storing the method of providing a related content by a service server as a program.

To accomplish the above object of the present invention, according to another aspect of the present invention, there is provided an end terminal requesting a related content, which comprises a communication unit configured to transmit/receive data through a LAN; an input unit configured to receive user's commands; a playing unit configured to play contents; and a controller configured to control the operations of the components, the controller transmitting a request for a content related to a basic content currently being played in the end terminal according to a user's command inputted through the input unit or selected by the user to a service server via a mobile communication terminal, displaying a list of related contents transmitted from the service server and a list of end terminals capable of receiving the related contents, and controlling the communication unit to transmit information about selection of a related content and an end terminal to the service server according to a user's command.

The controller may additionally perform an operation of displaying a related content selecting menu in the form of a pop-up window on a screen of the playing unit and displaying the end terminal list received from the service server in the form of a pop-up window on the screen.

To accomplish the above object of the present invention, according to another aspect of the present invention, there is provided a related content requesting method by an end terminal, which comprises connecting the end terminal to a service server via a mobile communication terminal through a LAN; transmitting a related content request to the service server; and transmitting basic content information.

The related content requesting method may further comprise transmitting information about selection of a related content and an end terminal to the service server.

To accomplish the above object of the present invention, according to another aspect of the present invention, there is provided a storage medium storing the related content requesting method by an end terminal as a program.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Preferred embodiments of the present invention will be described in detail with reference to the accompanying drawings.

In the following description of the present invention, a detailed description of known functions and configurations incorporated herein will be omitted when it may obscure the subject matter of the present invention. Also, the terms used in the following description are terms defined taking into consideration the functions obtained in accordance with the present invention. The definitions of these terms should be determined based on the whole content of this specification because they may be changed in accordance with the option of a user or chip designer or a usual practice.

A related content providing system 100 according to an embodiment of the present invention will now be explained with reference to FIGS. 1 and 2.

Figure 1:
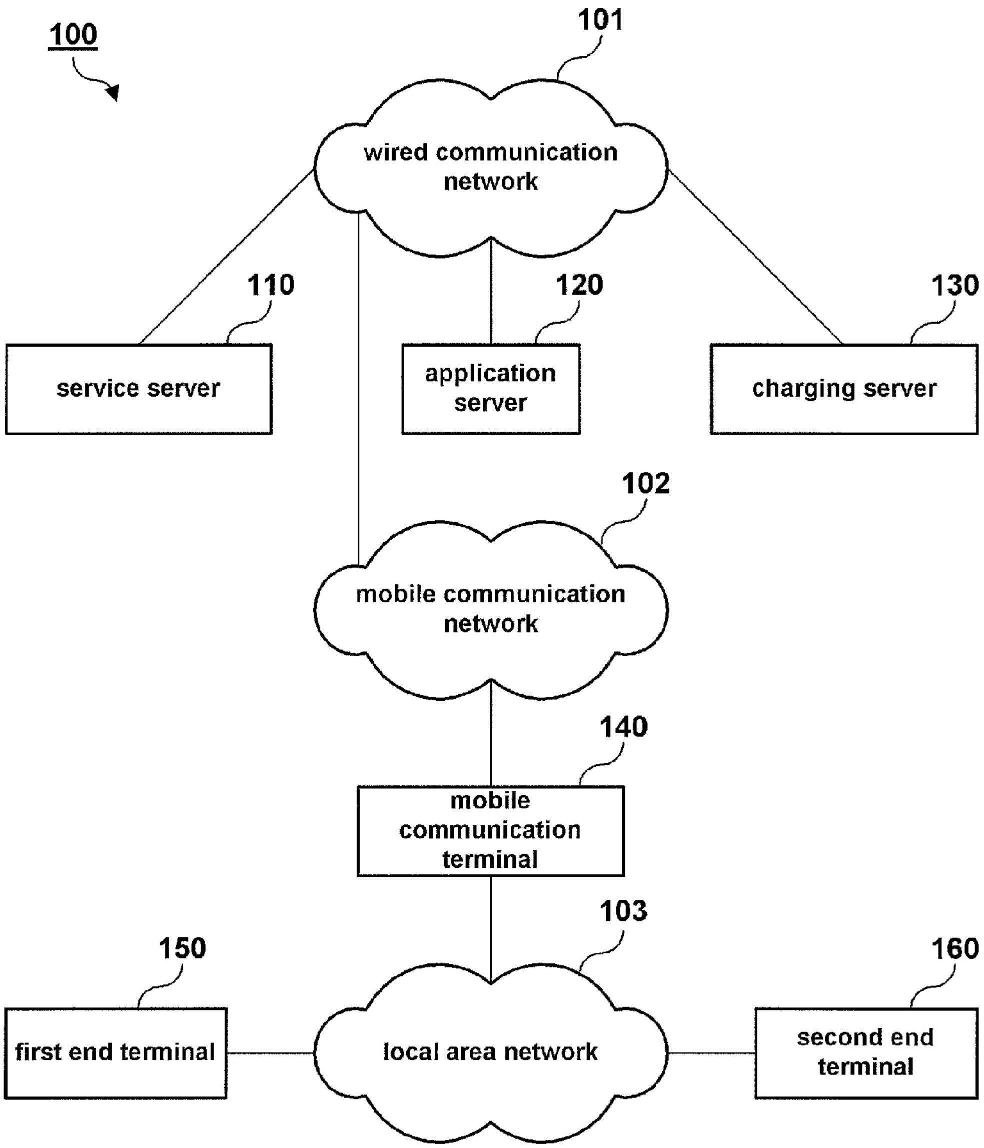
FIG. 1 illustrates a configuration of a related content providing system according to an embodiment of the present invention.
Figure 2:
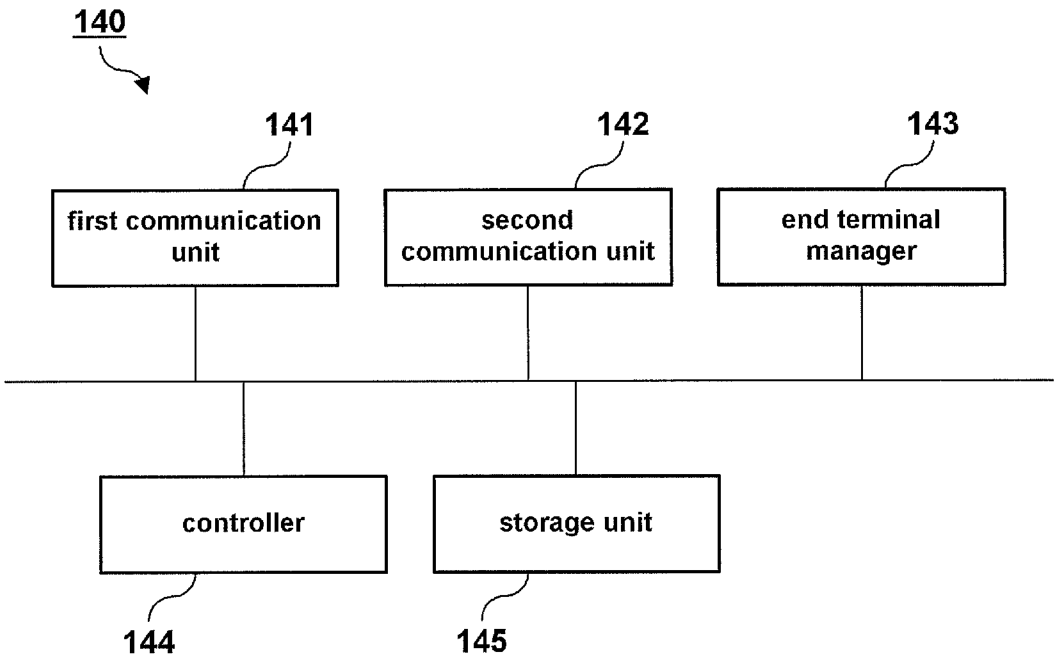
FIG. 2 is a block diagram of a mobile communication terminal shown in FIG. 1.
Figure 8:
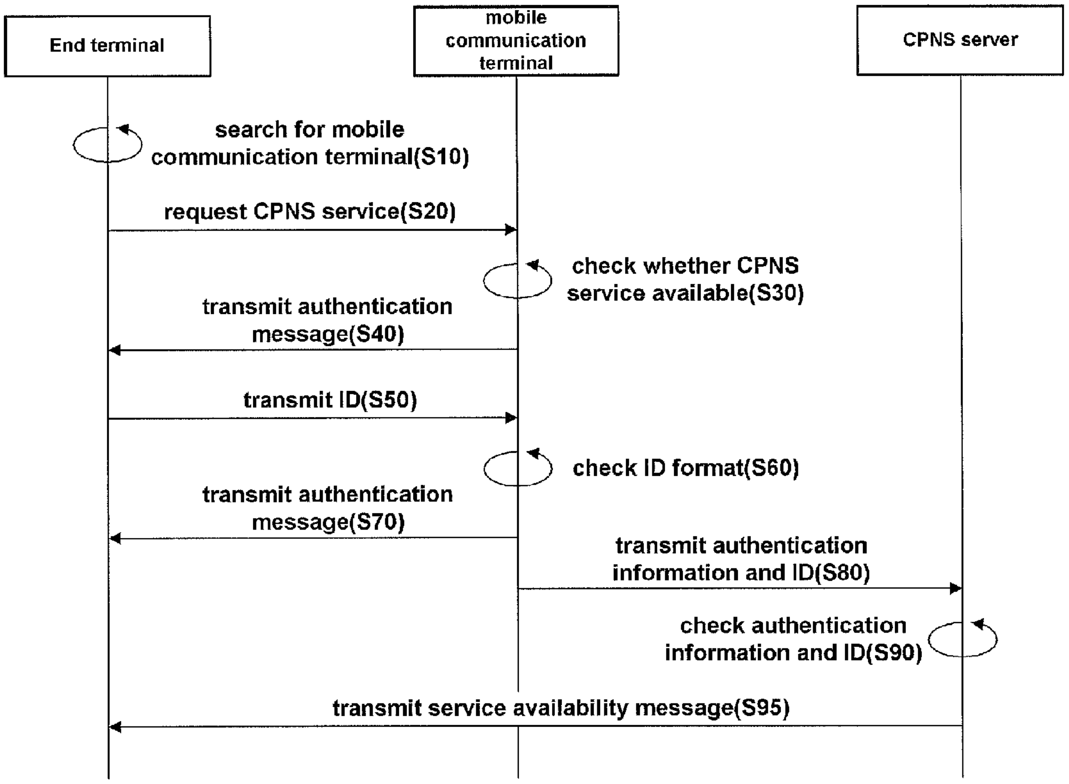
FIG. 8 is a flowchart illustrating an initialization process for the related content providing system according to the present invention.

FIG. 1 illustrates a configuration of the related content providing system 100 according to an embodiment of the present invention, FIG. 2 is a block diagram of a mobile communication terminal shown in FIG. 1, and FIG. 8 is a flowchart illustrating an initialization process for the related content providing system according to the present invention.

Referring to FIG. 1, the related content providing system 100 according to an embodiment of the present invention includes a service server 110, an application server 120 and a charging server 130, which are connected through a wired communication network 101 and/or a mobile communication network 102, a mobile communication terminal 140 connected to the service server 110 through the mobile communication network 102, and end terminals 150 and 160 connected to the mobile communication terminal 140 through a local area network (LAN) 103. Here, the LAN may use a wireless LAN, Bluetooth, UWB, etc. The application server 120 and/or the charging server 130 may be included in the service server 110 as components thereof.

The related content providing system 100 is subjected to the initialization process shown in FIG. 8 to recommend an efficient connecting path.

Specifically, an end terminal 170 detects a mobile communication terminal which will function as a gateway connected to the service server 110 to use a service in step S10. Then, the end terminal 170 requests the detected mobile communication terminal to provide the service in step S20. Here, the end terminal 170 transmits account information to use the service.

The mobile communication terminal checks whether the service is available for the end terminal 170 when receiving the service request from the end terminal in step S30.

The mobile communication terminal transmits an authentication message to the end terminal 170 in step S40 when the service is available. The mobile communication terminal transmits a service unavailability message to the end terminal 170 and ends the process when the service is not available.

The end terminal 170 transmits the account information ID thereof in step S50.

The mobile communication terminal checks if the format of the account information transmitted from the end terminal 170 corresponds to the format issued by the service server 110 and transmits an authentication message to the end terminal 170 when the formats correspond to each other in steps S60 and S70. If the formats do not correspond to each other, the mobile communication terminal transmits a service unavailability message to the end terminal 170 and ends the process.

The mobile communication terminal transmits authentication information and account information of the mobile communication terminal and the end terminal 170 to the service server 110 in step S80.

The service server 110 checks the account information to determine whether the service is available for the mobile communication terminal and the end terminal 170 in step S90.

If the service is available for both the mobile communication terminal and the end terminal 170, the service server 110 notifies the end terminal 170 that the service is available such that the end terminal 170 can use the service in step S95.

The first end terminal 150 requests the application server 120 to transmit a content related to the basic content currently played in the first end terminal or selected by a user to the second end terminal 160 ('basic content' means a content currently being run/played by the end terminal or selected by the user throughout the specification). The first end terminal 150 may be an MP3 player, PMP, or UMPC, which has a communication unit configured to be connected to the LAN 103. The basic content is a content stored in or played by the first end terminal 150 and the related content means a content related to the basic content. For example, the related content may be music video, album information, singer information, signal picture, singer related news, concert information, Karaoke file, etc. if the basic content is a music file. However, the present invention is not limited to the music file as the basic content and is applicable to various contents including texts, music, still images, videos, etc.

The second end terminal 160 plays the related content received from the application server 120.

The mobile communication terminal 140 transmits data between the end terminals 150 and 160 and the service server 110 and between the end terminals 150 and 160 and the application server 120. The configuration of the mobile communication terminal 140 will now be explained with reference to FIG. 2.

A first communication unit 141 transmits/receives data through the mobile communication network 102. A second communication unit 142 transmits/receives data through the LAN 103. The second communication unit 142 can correspond to two or more LAN communication protocols to cope with various types of LAN. An end terminal manager 143 stores end terminal information. A controller 144 controls the operations of the components of the mobile communication terminal 140. A storage unit 145 stores the end terminal information.

The service server 110 receives the related content transmission request from the first end terminal 150 and requests the application server 120 to search for the related content and transmit the related content to the second end terminal 160.

The application server 120 transmits the related content to the second end terminal 160 at the request of the service server 110.

The charging server 130 charges the mobile communication terminal 140 when the application server 120 provides the related content to the second end terminal 160.

A related content providing method according to an embodiment of the present invention will now be explained with reference to FIG. 3.

Figure 3:
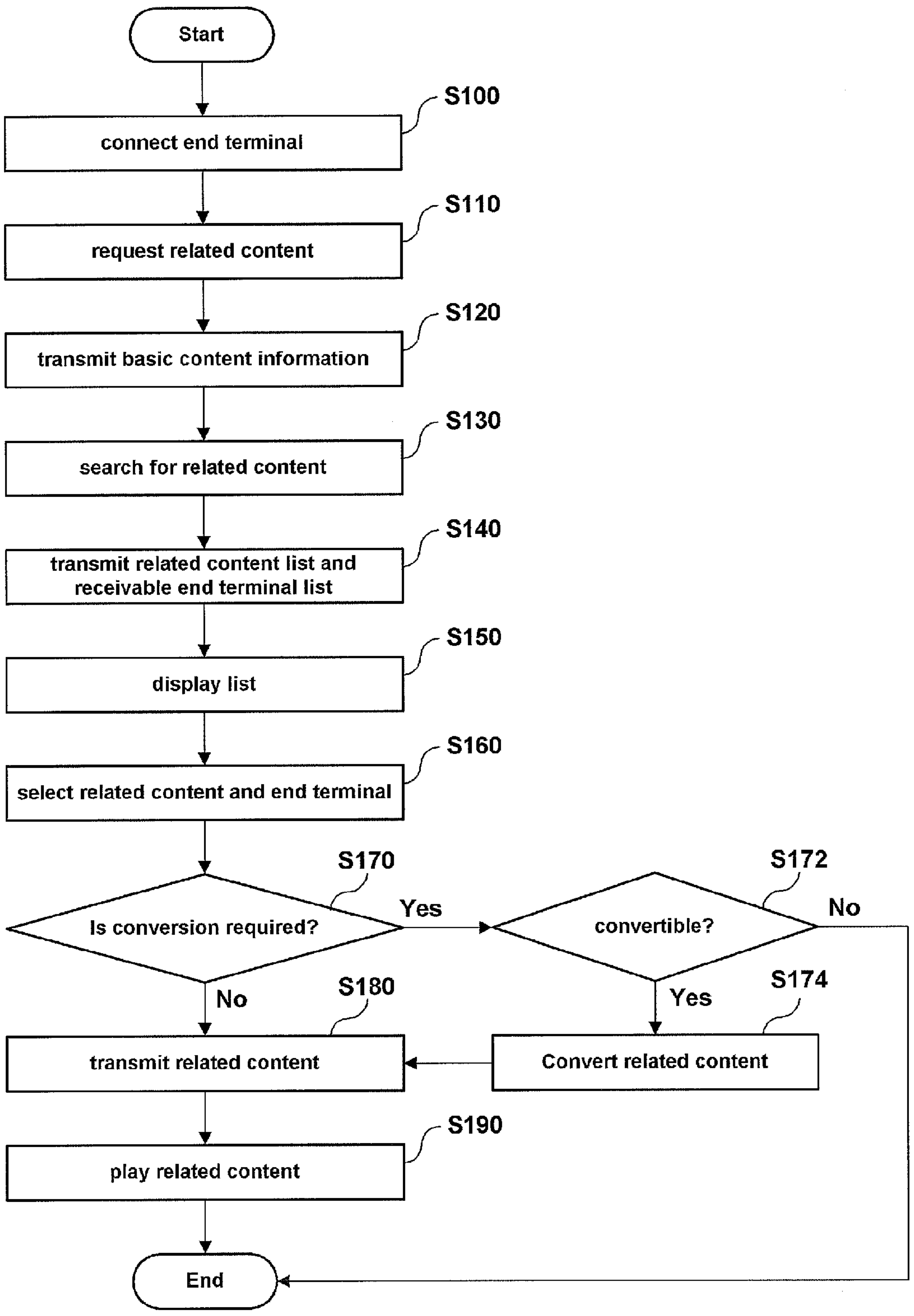
FIG. 3 is a flowchart illustrating a related content providing method according to an embodiment of the present invention.

FIG. 3 is a flowchart illustrating the related content providing method according to an embodiment of the present invention.

The related content providing method is applied to a system in which first and second end terminals are connected to a mobile communication terminal through a LAN, the mobile communication terminal is connected to a service server through a mobile communication network, and the service server is connected to an application server through a wired communication network.

Referring to FIG. 3, the first end terminal is connected to the service server via the mobile communication terminal in step S100.

The first end terminal requests the service server to provide a content related to a basic content in step S110.

The first end terminal transmits information about the basic content to the service server in step S120. For example, a meta file can be transmitted as the basic content information if the basic content corresponds to an MP3 file.

The service server requests the application server to search for the related content based on the basic content information in step S130.

The service server transmits a list of searched related contents and a list of end terminals capable of receiving the related contents to the mobile communication terminal in step S140. The list of end terminals capable of receiving the related contents can include any end terminal currently connectable to the mobile communication terminal through the LAN.

The mobile communication terminal or the first end terminal displays the received related content list and the end terminal list in step S150.

The mobile communication terminal or the first end terminal selects a related content, which will be received by the mobile communication terminal or the first end terminal, and the second end terminal as the end terminal that will receive the related content in step S160.

The service server checks whether the related content requires conversion in step S170. The conversion may be required when the second end terminal has hardware specifications that cannot directly play the related content.

If the conversion is required, the service server checks whether the related content can be converted in step S172. This step is necessary because the author of the related content may not allow the conversion or the conversion may be impossible due to technical difficulty.

The related content is converted based on the hardware specifications of the second end terminal when the conversion is available in step S174. Here, the related content may be converted by the application server or the service server.

The application server transmits the selected related content to the selected second end terminal at the request of the service server in step S180. Here, it is noted that the service server transmits the related content to the second end terminal if the related content is converted by the service server. In addition, a charging server can charge the mobile communication terminal when the related content is transmitted.

The second end terminal plays the related content in step S190.

The service server 110 which provides the related content according to an embodiment of the present invention will now be explained with reference to FIG. 4.

Figure 4:
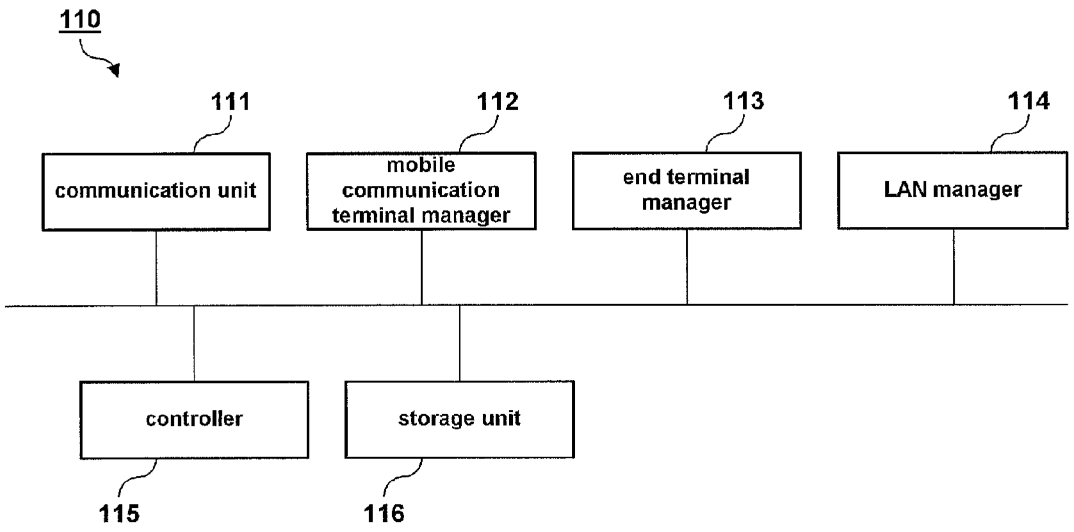
FIG. 4 is a block diagram of a service server according to an embodiment of the present invention.

FIG. 4 is a block diagram of the service server 110 according to an embodiment of the present invention.

Referring to FIG. 4, in the related content providing service server 110 (referred to as simply 'service server' hereinafter for convenience of explanation), a communication unit 111 transmits/receives data through the mobile communication network.

A mobile communication terminal manager 112 manages information about the mobile communication terminal, received through the communication unit 111. The information about the mobile communication terminal may include the product model, hardware specifications, user information and service charge type of the mobile communication terminal.

An end terminal manager 113 manages information about the first and second end terminals, received through the communication unit 111. The information about the first and second end terminals may include the product models, hardware specifications and accounts of the first and second end terminals.

A LAN manager 114 manages information about the LAN which relays communications between the mobile communication terminal and the end terminals. The information about the LAN may include the standards of the LAN, a log-in account if log-in is required, etc.

A storage unit 116 stores the information about the mobile communication terminal, the end terminals and the LAN.

A controller 115 controls the operations of the components of the service server 110. Specifically, the controller 115 requests the application server to search for a related content and transmit the related content to the second end terminal when receiving a related content transmission request from the first end terminal. The controller 115 may check whether the related contents requires conversion based on the hardware specifications of the second end terminal, managed by the end terminal manager 113, and request the application server to convert the related content through the communication unit 111 if the related content requires conversion. Here, the controller 115 may additionally perform an operation of receiving the related content from the application server and converting the related content when the related content requires conversion if required. Furthermore, it is noted that the controller 115 transmits a list of end terminals capable of receiving contents to the first end terminal with reference to history information of the first end terminal when requested by the first end terminal to provide the end terminal list and sets the end terminal selected by the first end terminal to the second end terminal.

A related content providing method performed by the service server according to an embodiment of the present invention will now be explained with reference to FIG. 5.

Figure 5:
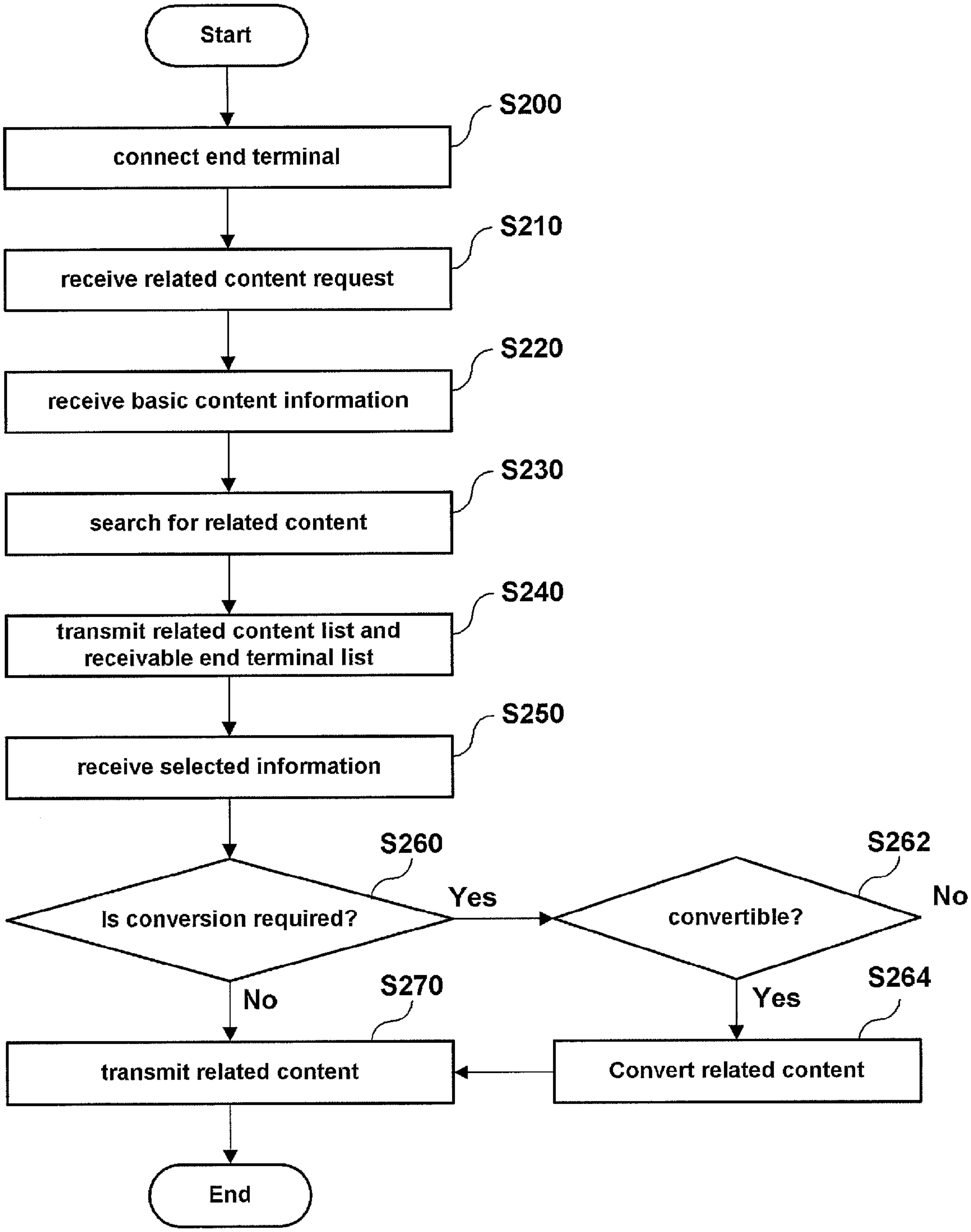
FIG. 5 is a flowchart illustrating a related content providing method performed by the service server according to an embodiment of the present invention.

FIG. 5 is a flowchart illustrating the related content providing method performed by the service server according to an embodiment of the present invention.

Referring to FIG. 5, the first end terminal is allowed be connected to the service server via the mobile communication terminal in step S200.

The service server receives a related content transmission request from the first end terminal in step S210.

The service server receives basic content information from the first end terminal in step S220.

The service server requests the application server to search for a related content based on the basic content information in step S230.

The service server transmits a list of searched related contents and a list of end terminals capable of receiving the related contents to the mobile communication terminal in step S240.

The service server receives information about selection of a related content and selection of the second end terminal as an end terminal that will receive the related content from the mobile communication terminal or the first end terminal in step S250.

The service server checks if the related content requires conversion in step S260.

The service server checks whether the related content can be converted when the related content requires conversion in step S262.

The service server requests the application server to convert the related content based on the hardware specifications of the second end terminal if the related content can be converted in step S262 and requests the application server to transmit the related content to the second end terminal in step S264. Here, the service server may convert the related content.

The service server requests the application server to transmit the selected related content to the second end terminal when the related content does not require conversion in step S260 or the step S264 has been executed.

The related content providing method performed by the service server can be stored in the form of a program in a storage medium.

Figure 6:
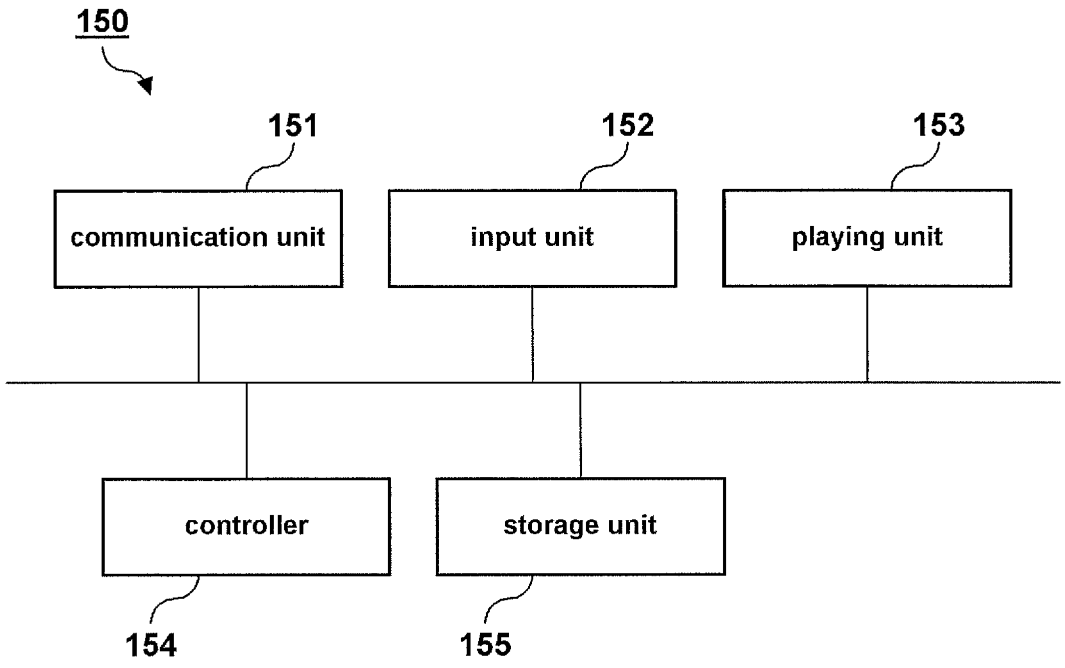
FIG. 6 is a block diagram of an end terminal according to an embodiment of the present invention

The end terminal 150 requesting a related content according to an embodiment of the present invention will now be described in detail with reference to FIG. 6. FIG. 6 is a block diagram of the end terminal 150 according to an embodiment of the present invention.

Referring to FIG. 6, in the end terminal 150 requesting a related content (referred to as simply 'end terminal' for convenience of explanation), a communication unit 151 transmits/receives data through the LAN.

An input unit 152 receives user's commands. The input unit 152 may use a switch, a keypad, a keyboard, a touch screen, etc.

A playing unit 153 plays contents.

A controller 154 controls the operations of the components of the end terminal 150. Specifically, the controller 154 transmits a basic content related content request to the service server via the mobile communication terminal according to a user's command inputted through the input unit 152. The end terminal 150 displays a list of related contents transmitted from the service server and a list of end terminals capable of receiving the related contents under the control of the controller 154. Furthermore, the controller 154 controls the communication unit 151 to transmit information about selection of a related content and an end terminal to the service server according to a user's command. Here, the controller 154 additionally performs an operation of displaying a related content selecting menu in the form of a pop-up window on the screen of the playing unit 153 and displaying the end terminal list received from the service server in the form of a pop-up window on the screen. Accordingly, the user can easily confirm the related content list and the end terminal list through the screen and execute a required operation through a simple operation of touching the screen or pressing a button.

A storage unit 155 stores identification information of the end terminal, basic content, and related contents if required.

A related content requesting method performed by the end terminal in accordance with an embodiment of the present invention will now be explained with reference to FIG. 7.

Figure 7:
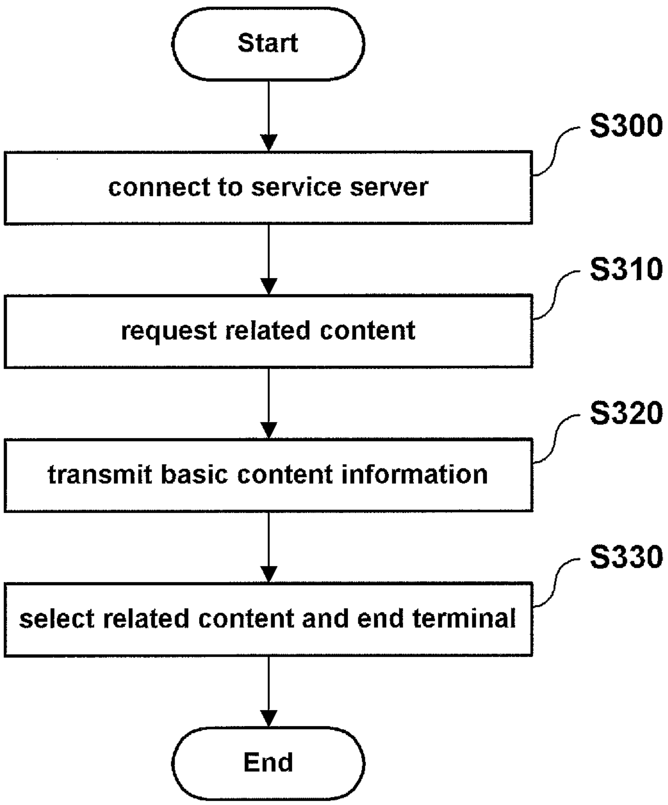
FIG. 7 is a flowchart illustrating a related content requesting method performed by the end terminal according to an embodiment of the present invention.

FIG. 7 is a flowchart illustrating the related content requesting method performed by the end terminal according to an embodiment of the present invention.

Referring to FIG. 7, the end terminal is connected to the service server via the mobile communication terminal through the LAN in step S300.

The end terminal transmits a related content request to the service server in step S310.

The end terminal transmits basic content information in step S320.

The end terminal transmits information about selection of a related content and an end terminal to the service server in step S330. Here, the step S330 can be omitted if the mobile communication terminal selects the related content and the end terminal.

The related content requesting method performed by the end terminal can be stored in the form of a program in a storage medium.

Figure 9:
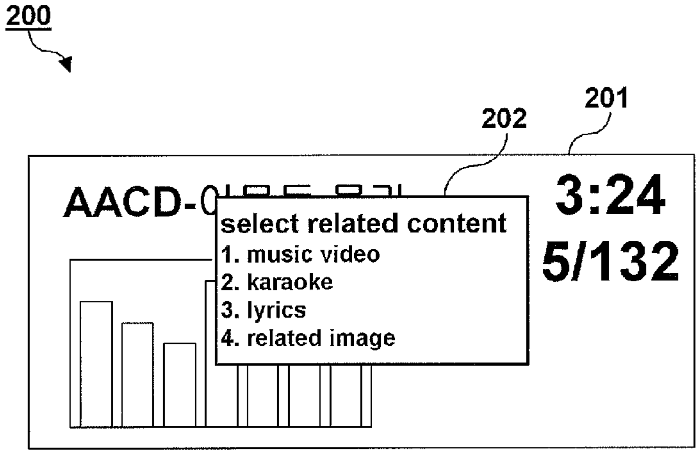
FIG. 9 shows an image displayed on the display of a first end terminal according to an embodiment of the present invention.

An application of the present invention will now be explained with reference to FIG. 9. FIG. 9 shows the screen of the display 200 of the first end terminal according to the application of the present invention.

A user plays a music file through the first end terminal. Here, the played music file corresponds to a basic content.

If the user wants to view the music video corresponding to the played music file, the user requests the service server to provide a related content. Here, it is assumed that the first end terminal has no hardware specifications for playing the music video. Accordingly, the user requests the service server to transmit the music video to the second end terminal capable of playing the music video. Specifically, when the user presses a menu button of the first end terminal, a menu window 202 is popped up on a music information display area 201 of the display 200 of the first end terminal, as shown in FIG. 9. Here, the displayed menu window may display various menus such as karaoke information, lyrics, related images, and more related contents in addition to the music video.

The service server receives information about the music file and searches the application server for a music video file corresponding to the music file.

When the service server finds the music video file, the service server provides a list of music video files (a plurality of music video files may be found according to resolution and audio quality of music videos, for example) and a list of end terminals connectable to the mobile communication terminal to the mobile communication terminal.

The user selects one of the music video files from the music video file list and selects the second end terminal from the end terminal list through the mobile communication terminal.

The service server receives information about the user's selection of the music video file and the second end terminal and checks whether the second end terminal can play the music video file.

If the second end terminal cannot play the music video file, the service server requests the application server to convert the music video file. Here, the service server may transmit information about the standards of the video files playable by the second end terminal.

The application server converts the music video file and transmits the converted music video file to the mobile communication terminal via a wired communication network and a mobile communication network.

The mobile communication terminal transmits the received music video file to the second end terminal. The second end terminal plays the music video file such that the user views the music video. Here, the charging server may charge the mobile communication terminal.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, the second end terminal having hardware specifications superior to those of the first end terminal can receive and play a content related to the basic content, stored in or played by the first end terminal.

What is claimed is:

1. A system for providing a related content, comprising:

a first end terminal connected to a mobile communication terminal through a LAN and requesting an application server to transmit a content related to a basic content currently played in the first end terminal or selected by a user to a second end terminal;

the mobile communication terminal connected to the first end terminal and the second end terminal through the LAN and connected to a service server through a mobile communication network, and configured to transmit data between the first and second end terminals and the service server and between the first and second end terminals and the application server;

the service server connected to the mobile communication terminal through the mobile communication network and connected to the application server through a wired communication network, and configured to receive the related content transmission request from the first end terminal and request the application server to search for the related content and transmit the related content to the second end terminal; and the application server connected to the service server through the wired communication network and configured to transmit the related content to the second end terminal at the request of the service server, wherein the service server checks whether the related content requires conversion based on hardware specification information of the second end terminal and additionally performs an operation of requesting the application server to convert the related content, or receives the related content from the application server for converting the related content, if the related content requires conversion, and then the service server transmits the related content to the second end terminal, wherein the service server transmits a list of end terminals capable of receiving contents to the first end terminal when requested by the first end terminal to provide the list of end terminals capable of receiving contents and sets an end terminal selected by the first end terminal to the second end terminal.

2. The system of claim 1, wherein the first end terminal displays a related content selecting menu in the form of a pop-up window on a screen and displays an end terminal list received from the service server in the form of a pop-up window on the screen.

3. The system of claim 1, further comprising a charging server connected to the service server through the mobile communication network or the wired communication network and configured to charge the mobile communication terminal when the related content is transmitted from the application server to the second end terminal.

4. A service server providing a related content, comprising:

a communication unit configured to transmit/receive data through a mobile communication network;

a mobile communication terminal manager configured to manage information about a mobile communication terminal, received through the communication unit;

an end terminal manager configured to manage information about first and second end terminals, received through the communication unit;

a LAN manager configured to manage information about a LAN that relays communications between the mobile communication terminal and the end terminals;

a storage unit configured to store the information about the mobile communication terminal, the end terminals and the LAN; and a controller configured to control the operations of the components, the controller searching for a content related to a basic content currently being played in the first end terminal or selected by a user through an applications server and requesting the application server to transmit the related content to the second end terminal when receiving a request for transmitting the related content to the second end terminal from the first end terminal, wherein the controller checks whether the related content requires conversion based on hardware specification information of the second end terminal managed by an end terminal manager and additionally performs an operation of requesting the application server to convert the related content through the communication unit if the related content requires conversion, or receiving the related content from the application server and converting the related content if the related content requires conversion, wherein the controller transmits a list of end terminals capable of receiving contents to the first end terminal.

5. The service server of claim 4, wherein the controller transmits a list of end terminals capable of receiving contents to the first end terminal when requested by the first end terminal to provide the list of end terminals capable of receiving contents and sets an end terminal selected by the first end terminal to the second end terminal.

6. A method for providing a related content in a system constructed in such a manner that a first end terminal and a second end terminal are connected to a mobile communication terminal through a LAN, the mobile communication terminal is connected to a service server through a mobile communication network, the service server is connected to an application server through a wired communication network, the method comprising:

connecting the first end terminal to the service server via the mobile communication terminal;

requesting the service server by the first end terminal to provide a content related to a basic content currently being played in the first end terminal or selected by a user;

transmitting basic content information from the first end terminal to the service server;

requesting the application server by the service server to search for the related content based on the basic content information;

transmitting a list of searched related contents and a list of end terminals capable of receiving the related contents from the service server to the mobile communication terminal;

displaying the related content list and the end terminal list through the mobile communication terminal or the first end terminal;

selecting the related content, which will be received by the mobile communication terminal or the first end terminal, and the second end terminal as the end terminal which will receive the related content; and transmitting the selected related content from the application server to the second end terminal at the request of the service server, further comprising before transmitting the related content from the application server to the second end terminal:

checking whether the related content requires conversion and if conversion is possible requesting the application server, when the related content can be converted, to convert the related content based on the hardware specification information of the second end terminal and transmitting the related content to the second end terminal.

7. The method of claim 6, further comprising playing the related content through the second end terminal.

8. A method of providing a related content by a service server, comprising:

allowing a first end terminal to be connected to the service server via a mobile communication terminal;

receiving a request for a related content from the first end terminal;

receiving information about a basic content currently being played in the first end terminal or selected by a user from the first end terminal;

requesting the application server to search for the related content based on the information about the basic content;

transmitting a list of the searched related contents and a list of end terminals capable of receiving the related contents to the mobile communication terminal;

receiving information about selection of a related content, which will be received by the mobile communication terminal or the first end terminal, and the second terminal as the end terminal which will receive the related content from the mobile communication terminal or the first end terminal; and requesting the application server to transmit the selected related content to the second end terminal, further comprising before requesting the application server to transmit the selected related content to the second end terminal:

checking whether the related content requires conversion and if conversion is possible based on hardware specification information of the second end terminal, converting the related content by the service server based on the hardware specification information of the second end terminal when the related content can be converted and transmitting the related content to the second end terminal.

9. A non-transitory storage medium storing the method of providing a related content by a service server in the form of a program comprising the steps of:

allowing a first end terminal to be connected to the service server via a mobile communication terminal;

receiving a request for a related content from the first end terminal;

receiving information about a basic content currently being played in the first end terminal or selected by a user from the first end terminal;

requesting the application server to search for the related content based on the information about the basic content;

transmitting a list of the searched related contents and a list of end terminals capable of receiving the related contents to the mobile communication terminal;

receiving information about selection of a related content, which will be received by the mobile communication terminal or the first end terminal, and the second terminal as the end terminal which will receive the related content from the mobile communication terminal or the first end terminal; and requesting the application server to transmit the selected related content to the second end terminal, further comprising before requesting the application server to transmit the selected related content to the second end terminal:

checking whether the related content requires conversion and if conversion is possible converting the related content by the service server based on the hardware specification information of the second end terminal when the related content can be converted and transmitting the related content to the second end terminal.

* * * * *